United States Patent [19]
LeGrand

[11] 4,341,824
[45] Jul. 27, 1982

[54] METHOD OF UPGRADING ROCK AND TREATED ROCK OBTAINED THEREFROM

[75] Inventor: Donald G. LeGrand, Burnt Hills, N.Y.

[73] Assignee: General Electric Company, Schenectady, N.Y.

[21] Appl. No.: 252,523

[22] Filed: Apr. 9, 1981

Related U.S. Application Data

[63] Continuation-in-part of Ser. No. 62,914, Aug. 2, 1979, abandoned.

[51] Int. Cl.³ .......................... A01N 1/00; A01N 3/00
[52] U.S. Cl. ...................................... 428/15; 106/90; 106/102; 106/308 N; 106/308 M; 427/136; 427/221; 427/341; 428/404
[58] Field of Search ............... 427/215, 220, 136, 221, 427/138, 336, 337, 341, 393.6, 419.1, 407.1; 428/13, 15, 404; 106/90, 308 N, 102, 308 M

[56] References Cited

U.S. PATENT DOCUMENTS

| | | | |
|---|---|---|---|
| 2,575,599 | 11/1951 | Silverman et al. | 106/90 |
| 3,287,145 | 11/1966 | Fischer | 106/90 |
| 3,491,049 | 1/1970 | Gibson et al. | 106/90 |
| 3,598,777 | 8/1971 | Wade | 428/404 |
| 3,965,284 | 6/1976 | Xanthos et al. | 427/221 |
| 4,054,000 | 10/1977 | Lisle | 428/13 |
| 4,056,655 | 11/1977 | Faille et al. | 427/393.6 |
| 4,137,088 | 1/1979 | Debus et al. | 106/90 |
| 4,194,023 | 3/1980 | Cushman et al. | 427/138 |

FOREIGN PATENT DOCUMENTS 642411  1/1979  U.S.S.R. .............................. 427/136

OTHER PUBLICATIONS

Wintermyer et al., "A Study of Dispersing Agents for Particle-Size Analysis of Soils", Public Roads, vol. 28, No. 3, pp. 55-62, Aug. 1954.
Franklin et al., "Barriers for Radon in Uranium Mines", Report of Investigations 8259, U.S. Dept. of Int., Bureau of Mines, 1977.
Geannette, M., "A Renaissance in Art Restoration", American Why, Jun., 1979.
Cement & Concrete Research, vol. 9, No. 4, Jul., 1979, pp. 417 & 515.
Cady et al., "Upgrading of Poor or Marginal Aggregates for PCC and Bituminous Pavements", Penna. State Univ., Report PTI 7707, May, 1977.
Godette et al., "Graffiti Removers: Evaluation & Preliminary Selection Criteria", NBSIR 75-914, Dec., 1975.
Godette et al., "Graffiti-Resistant Coatings: Methods of Test & Preliminary Selection Criteria", National Bureau of Standards, NBSIR 75-789, Nov., 1975.
NBS Technical Note 941, Stone Preservatives, May, 1977.
Sleater, "A Review of Natural Stone Preservation", NBSIR 74-444, Dec. 1973.
Dunn et al., "Frost and Sorption Effects in Argillaceous Rocks".

Primary Examiner—John D. Smith
Assistant Examiner—S. L. Childs
Attorney, Agent, or Firm—William A. Teoli; James C. Davis, Jr.

[57] ABSTRACT

A method is provided for upgrading rock in the form of aggregate, block, shaped stone or concrete structures involving the treatment of such rock with a dilute aqueous solution of polyelectrolyte. Enhanced degradation resistance is achieved by further wetting the polyelectrolyte treated rock with a multi-valent ion metallic salt solution. Treated aggregate, portland cement and bituminous concrete compositions containing such treated aggregate are also provided.

26 Claims, 4 Drawing Figures

METHOD OF UPGRADING ROCK AND TREATED ROCK OBTAINED THEREFROM

CROSS REFERENCE TO RELATED APPLICATIONS

This application is a continuation-in-part of my application Ser. No. 062,914, filed Aug. 2, 1979, now abandoned, which is assigned to the same assignee as the present invention.

BACKGROUND OF THE INVENTION

Prior to the present invention, various methods were evaluated for treating rock to render the rock more resistant to environmental degradation. There have been many studies and methods of improving the quality of building stone and monuments, and limited study has been devoted to coarse aggregate quality improvement.

One study directed to aggregate improvement is shown by the interim report of May 1977, revised and updated January 1978, report PTI 7707 of the Pennsylvania Transportation Institute of Pennsylvania State University of P. V. Cady, "Upgrading of Poor or Marginal Aggregates for PCC and Bituminous Pavements". Various organic materials were evaluated as treating agents for improving the resistance of aggregate to degradation. Although valuable information has been generated from the aforementioned study, a satisfactory solution to the problem of aggregate degradation resulting from exposure to adverse environmental conditions including air pollution, moisture, or inorganic salt contact has not been found. Improvement has been noted by using organic materials, such as epoxy resins, methyl methacrylate, etc., to treat marginal aggregate, but the degree of aggregate upgrading achieved has not warranted the cost of using such material unless the organics were extensively diluted in polluting organic solvents.

Standard engineering tests can be performed to predict the quality of aggregate. One procedure, for example, has been the magnesium or sodium sulfate soundness test, ASTM C88-76. In many instances, local high quality course aggregate is not available for building construction and must be obtained at a high transportation cost. Various procedures have been used in an attempt to improve the quality of marginal or submarginal rock, for example, argillaceous limestone, highly crystalline limestone and graywacke sandstone to upgrade such material for use in portland cement or bituminous concrete. Procedures of the prior art have been found to be unacceptable because of economic or environmental reasons, or the treated rock failed to survive the magnesium or sodium sulfate soundness test.

Improved results have been achieved as shown by U.S. Pat. No. 4,256,501 of George M. Banino, based on the use of an organic solvent mixture of an organic condensation polymer and an aliphatic polyamine. However, organic solvent can present environmental pollution problems. In addition, the aforementioned aryl condensation polymer, for example, silicone-polycarbonate block polymers can significantly increase the cost of such treatment due to the expense of the starting reactants.

The present invention is based on the discovery that polyelectrolytes, i.e., polymeric substances in which the monomeric units of its constituent macro-molecules possess ionizable groups, for example, polyethylenepolyamine, can be employed in the form of an aqueous solution to treat rock, stone or aggregate in the substantial absence of any unhardened cement, or material with adhesive and cohesive properties which make it capable of binding mineral fragments into a compact whole. As shown by AM Neville, Properties of Concrete, on pages 1–102, Wiley Sons, New York, 1973, the term cement includes hydraulic cement. The degradation resistance of the treated rock has been found to be dramatically improved, particularly if the polyelectrolyte treated rock is further wetted with certain metallic salt solvent solutions. It has been found that treatment of the rock, stone, or aggregate in accordance with the practice of the invention can be accomplished in an economic and non-polluting manner.

STATEMENT OF THE INVENTION

Although the reason why dramatic upgrading of aggregate, or the improvement in degradation resistance of free standing stone or concrete structures to adverse environmental conditions is achieved by the method of the present invention is not completely understood, one possible explanation is that the polyelectrolyte in the substantial absence of unhardened cement forms a membrane or semipermeable barrier on either the rock surface, or if the rock is porous, the rock interior. The membrane may act as a barrier to deleterious elements responsible for rock degradation, while at the same time allow for the transport of water.

There is provided by the present invention, a method for upgrading rock having an average diameter of at least ¼" in the substantial absence of unhardened cement which comprises, (1) wetting the rock with an aqueous polyelectrolyte solution having at least 1% by weight of polyelectrolyte, and (2) allowing or effecting the drying of the polyelectrolyte treated rock.

Another aspect of the present invention, is directed to a method for further treating the polyelectrolyte upgraded aggregate with a gellation agent to further improve aggregate performance with respect to environmental degradation which comprises (1) contacting aggregate which has been treated with polyelectrolyte in the substantial absence of unhardened cement, with a gellation agent in the form of an aqueous solution of a multivalent metallic salt, (2) allowing or effecting the drying of the resulting treated aggregate.

Additional aspects of the present invention relate to polyelectrolyte treated aggregate, polyelectrolyte treated metallic salt gellation agent and reinforced portland cement compositions containing such treated aggregate.

Included by the term "polyelectrolyte" as used in the practice of the present invention, is any water soluble ionic polymer in the form of either polyacid, polybase, or polyampholite, depending upon the nature of its ionization in water solution. A more comprehensive definition of the term polyelectrolyte can be found in the Encyclopedia of Polymer Science and Technology, Vol. 10, pp. 781–861 (1969) John Wiley & Sons, New York. The preferred polyelectrolytes are polyethyleneimine or polyalkylene polyamine, manufactured by the Dow Chemical Company, Midland, Mich., having a molecular weight in the range of from about 200 to about 1000. Some of these preferred polyelectrolytes are anhydrous polyalkylene polyamine polymers (XD-3259.01) of the Dow Chemical Company, having the following characteristics: sp

| Property | XD-30259.01 |
| --- | --- |
| Formula | $H_2N(C_2H_4NH)_nH$ |
| Molecular weight | Approx. 250–300 |
| Boiling Range, °C. | >250° C. at 760 mm. Hg |
| Freezing Point, °C. | Below 40[1] |
| Specific Gravity, 25/25° C. | 1.02 |
| Pounds per Gallon, 25° C. | 8.46 |
| Flash Point, °F. | 425 Cleveland open Cup |
| Approximate Solubility grams per 100 grams solvent at 25° C. | |
| Acetone | |
| Benzene | |
| Carbon Tetrachloride | Reacts Violently |
| EthylEther | |
| n-Heptane | <0.1 |
| Methanol | |
| Water | |

[1] Pour Point

Some of the following Quarternized polyalkylene polyamines XD-30267, XD-30268, XD-30269 and XD-30269.01 are also included.

| Property | XD-30267 | XD-30268 | XD-30269 | XD-30269.01 |
| --- | --- | --- | --- | --- |
| % of Quaternization | 10 | 25 | 50 | 75 |
| Mol. Wt. | 40–80,000 | 40–80,000 | 40–80,000 | 40–80,000 |
| pH, 25° C. | 9 | 8 | 8 | 8 |
| % Solids, Active | 35 | 35 | 35 | 35 |
| % Solids, Non-volatile | 50.4 | 50.3 | 51.2 | 49.6 |
| Viscosity, cps, Brookfield RTV #3 Spindle at 100 RPM #3 Spindle at 50 RPM | 1502 | 478 | 167 | 55 |
| Specific Gravity, 25/25° C. | 1.152 | 1.161 | 1.163 | 1.164 |
| Pounds per gallon, 25° C. | 9.6 | 9.67 | 9.7 | 9.7 |

Polyvalent metallic salts which can be used as gellation agents for polyelectrolyte treated aggregate in accordance with the practice of the present invention are salts of Group IIA, IIIA and IVA metals having anions selected from halides, acetates, sulfates, chromates, phosphates, etc. In order to determine whether a polyvalent metallic salt can perform effectively as a gellation agent, a dilute aqueous solution of the metallic salt, for example, a 10% solution can be added with stirring to a dilute aqueous solution of the polyelectrolyte. Gellation or precipitation of polyelectrolyte product indicates the polyvalent metallic salt is an effective gellation agent.

The term "rock" as employed in the description of the method of the present invention is intended to include stone, aggregate, block, concrete, having a diameter of at least ¼" as well as existing stone structures, etc. More particularly, rock refers to those rocks containing 50% or more of siliceous minerals and those rocks containing 50% or more of carbonate minerals. Silicious rock is represented, for example, by dark gray, fine-grained graywacke sandstone with interbedded black shale layers and beds. Carbonate rocks are represented, for example, by medium crystalline metamorphic dolomitic marble; medium to dark gray, fine grained dolomite to argillaceous dolomite with interbedded black shale partings; and an inter-reef deposit of nearby black, fine grained, argillaceous dolomite to shalely dolomite. In addition to these aggregate rock, those skilled in the art also would know that surface treatment of existing stone structures, for example, monuments, road surfaces, bridges, buildings, etc., having existing shaped stone surfaces also can be benefited and are included with the scope of the present invention. Existing bridge surfaces can be initially treated with the above described polyelectrolyte followed by a post treatment with the above described polyvalent metallic salt gellation agent. An example of building stone is a fine grained graywacke sandstone which can be medium to dark gray to greenish gray.

Figure 1:
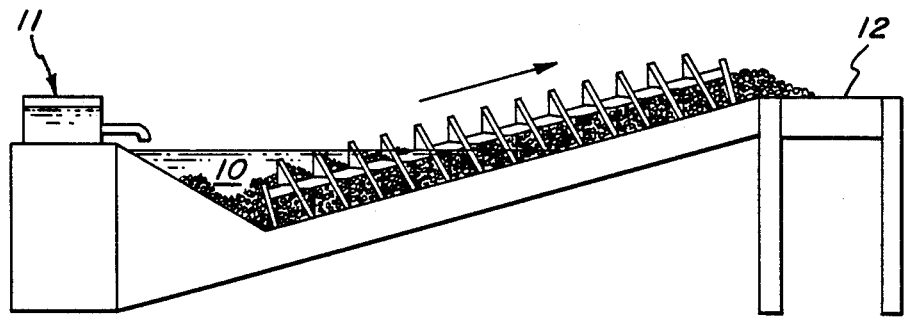
FIGS. 1–4 are diagrammatic views showing various procedures of treating aggregate in accordance with the practice of the present invention.

More particularly, in FIG. 1, there is shown an inclined spiral screw assembly extending into a well at 10. Aggregate feed is fed into the well at 10 and aqueous polyelectrolyte, or "treating solution", is fed into the same location from a reservoir at 11 to produce an aggregate bed immersed in treating solution. The spiral screw is thereinafter rotated to convey the aggregate up an incline to a discharge point at 12 and the treated aggregate is then conveyed to a collection point not shown and allowed to dry under atmospheric conditions. Total treating time, that is time in which the aggregate is fed into the treating solution until it is discharged, can vary from 15 seconds to 90 seconds.

Figure 2:
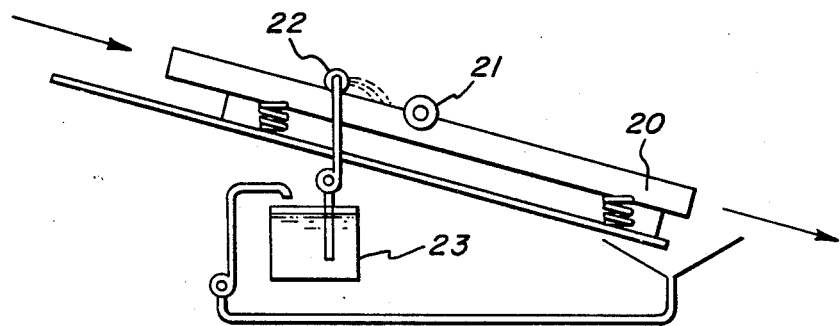

FIG. 2 shows a slightly inclined screen deck at 20 and a vibrator at 21 to allow for the forward movement of aggregate which is fed from the upper section of the deck and which is allowed to pass under a spray bar at 22 and then discharged at the end of the screen deck into a collection bin not shown. The treating solution is then collected at the end of the screen deck and recycled to the holding tank. It has been found that the total time for treating the aggregate on the screen deck can vary between about 15 seconds to 30 seconds before it is discharged.

Figure 3:
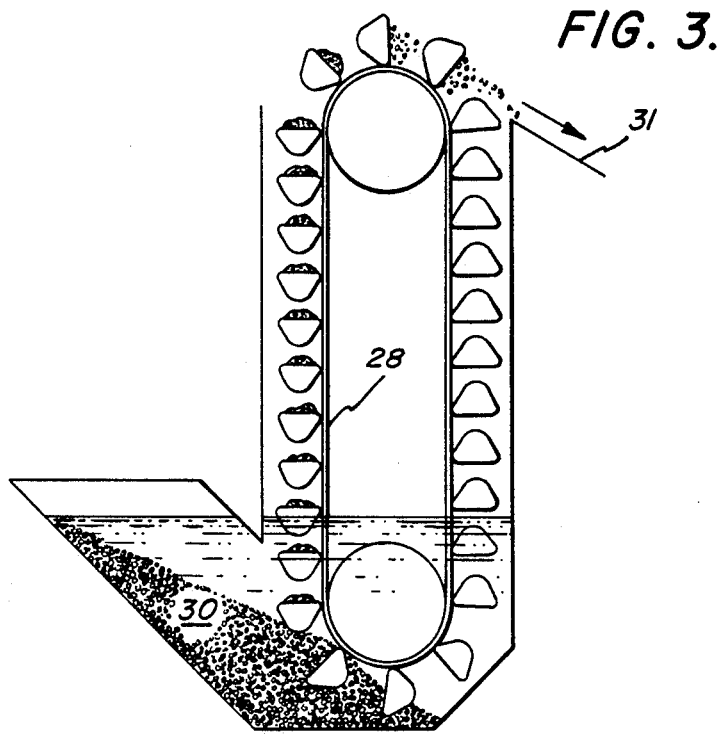

Another variation of aggregate treatment is shown in FIG. 3 utilizing a bucket elevator 28 which is passed through an aggregate bed at 30 which is immersed in treating solution. The treated aggregate is discharged at the top of the elevator at 31. The total aggregate treating time through treating bed averages about 15 seconds to 1 minute.

Figure 4:
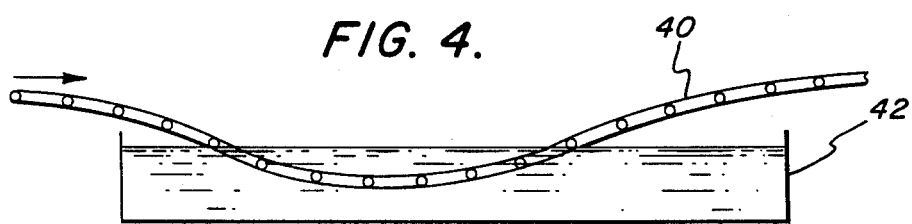

A further variation of treating aggregate in accordance with the practice of the present invention is shown in FIG. 4 showing the immersion of aggregate on a moving conveyer belt through a holding tank 42 containing treating solution. The average treating time in and out of the bath can vary between 15 seconds to one minute depending on various factors such as speed of the conveyer belt, the concentration of the treating solution, etc.

In the practice of the invention, aggregate can be fed into the treating solution and the treated aggregate can thereafter be allowed to dry. As previously indicated, the time for treating the aggregate can vary widely for effective results. Experience has shown that a solids concentration of between about 2 to 25% by weight of polyelectrolyte based on total weight of solution will provide effective results in the treating bath. Higher or lower concentrations can also be utilized, however, those skilled in the art would know that longer contact time can be required, or waste of polyelectrolyte might readily result rendering the procedures uneconomic.

In particular instances, forced air can be used to effect the drying of the treated rock.

Further treatment of the polyelectrolyte treated aggregate made by procedures described above as, for example, by FIGS. 1-4, can be achieved by subsequent use of a gellation agent in a bath in place of the polyelectrolyte.

The test method used to evaluate rock treated in accordance with the practice of the present invention is the sulfate soundness test. More specifically, the rock was tested in accordance with New York State Department of Transportation "Soundness of Course Aggregates by Magnesium Sulfate Solutions", test method New York 207 B-76. This test is based on the ASTM soundness of aggregates by use of sodium sulfate or magnesium sulfate test method C88-76. The New York State test method maintains a solution temperature of 74° plus or minus 1° F. Another significant distinction between the two test methods is that the New York State test method is based on a 10 cycle test while the ASTM test is run on a 5 cycle test.

The term aggregate as utilized in the practice of the present invention includes crushed stone and gravel and can vary in size from approximately ¼" to 4" in diameter. Preferably, the average diameter of the aggregate is ¼" to 1½". It is preferred to utilize aggregate in the practice of the present invention in the substantial absence of unhardened cement, or any material falling outside of the aforedescribed aggregate definition which would interfere or compete with the surface treatment of the aggregate by the polyelectrolyte.

Aggregate utilized in the test method for evaluation is initially screened to separate out the fraction passing a ½ inch screen and retained on a ¼ inch screen. The sized aggregate is then washed to remove any dust or coatings. The washed aggregate is then dried in an oven to constant weight at a temperature of 230° F. plus or minus 90° F. The dried sample is then weighed to obtain a 2500 gram plus or minus 50 gram charge.

The dried aggregate is then placed into a wire mesh basket and immersed into the treating solution for about 30 seconds to 1 minute and agitated slightly to displace any air pockets. The basket is then removed from the solution of the composition and allowed to set for several minutes until little or no solution runoff is observed. The treated sample is then dried in an oven at a temperature of 230° F. plus or minus 9° F. to a constant weight.

The treated sample is then tested for its ability to resist environmental degradation by immersing it while in a wire basket into a magnesium sulfate solution for 16-18 hours. After immersion, the sample is removed and allowed to drain for about 15 minutes and then placed into a drying oven which is at a temperature of 230° F. plus or minus 9° F. The sample is then dried to 6½ hours, completing one cycle. The process of alternate immersion and drying was repeated for 10 full cycles.

After completing the final cycle, the sample is washed free of any magnesium sulfate and then dried to a constant weight of a drying oven at a temperature of 290° F. plus or minus 9° F. The dried aggregate is then resieved over ¼ inch sieve and the weight recorded. The difference between the final weight and the original weight represents the loss due to "D" or "degradation". The %D is expressed as a percentage of the original weight.

In instances where blocks of stone are tested, a modification of the above-described aggregate test procedure is employed. Approximately cubical shaped blocks ranging from about 1½ inch to 3 inches on a side are separated from larger blocks either by sawing or by breaking the stone with a hammer and chisel. The blocks are then either soaked in the test solution for up to one minute, or coated with the solution using a paint brush. The blocks are then placed in an oven at a temperature of 230° F. plus or minus 9° F. to constant weight. The temperature of 230° F. plus or minus 9° F. to constant weight. The prepared samples are then subjected to alternate immersion and drying for 10 cycles in the same manner as described above for the aggregate. Upon completion of the final cycle, the blocks are then washed free of magnesium sulfate and the %D is observed quantitatively in terms of percent weight loss based on the original weight of sample.

In order that those skilled in the art will be better able to practice the invention, the following examples are given by way of illustration and not by way of limitation. All parts are by weight.

EXAMPLE 1

Marble and limestone aggregate were classified to size in accordance with the previously described procedure. Aqueous solutions of polyethyleneimine (PEI-6) having a molecular weight of about 300, manufactured by the Dow Chemical Company were also prepared. The concentration of PEI in water (g/dl) had a value between 0.3 and 1.0. A solution of 3 g/dl of PEI-6 in acetone was also prepared.

The aggregate was then treated with PEI-6 by placing it in a wire basket dipping it into the aqueous PEI solution and allowing it to dry. The treated aggregate was then tested for its ability to resist environmental degradation in accordance with the Sulfate Soundness test as described above. The following results were obtained, where "conc" is concentration, (g/dl) of PEI-6, "L" under Rock is limestone and "M" under rock is marble and %D is the percent weight loss of aggregate experienced after the magnesium sulfate treatment is compared to the original weight of the aggregate:

TABLE I

| Solvent | Conc | Rock | % D |
| --- | --- | --- | --- |
| Water | 0 | L | 72.0 |
| Water | 0 | M | 36.8 |
| Acetone | 3 | L | 13.87-19.8 |
| Water | 3 | L | 5.48 |
| Water | 1.0 | M | 9.49 |

The above results show that treatment of the aggregate with polyethyleneimine (PEI-6) considerably enhanced the degradation resistance of the aggregate. A significant variation is shown in limestone aggregate reflecting the variation in the rock being tested.

EXAMPLE 2

The procedure of Example 1 was repeated except that argillaceous dolomite aggregate was evaluated. There was utilized a 5% aqueous polyethyleneimine solution and the treated aggregate was air dried. It was found that the percent degradation was 10.2% for the treated aggregate, and 14.2% for the untreated using a sodium sulfate solution.

EXAMPLE 3

Graywacke sandstone (B) and argillaceous dolomite aggregate (D) were evaluated for degradation resistance after being treated with various polyelectrolytes. In addition to PEI-6 as utilized in the previous examples, there were also employed as polyelectrolytes, PEI XD 30259.01, PEI XD 30269.01, polyacrylic acid (PAA) and Jeffamine T-403, a tris-2-aminopropylether of triol, manufactured by the Jefferson Chemical Company. The following results were obtained:

TABLE II

| Polyelectrolyte | conc (g/dl) | Rock | %D |
| --- | --- | --- | --- |
| PEI-6 | 0 | D | 26.1 |
| PEI-6 | 1.0 | D | 4.1 |
| PEI XD 30259.01 | .5 | D | 4.2 |
| PEI XD 30269.01 | .5 | D | 18 |
| Jefumine T.403 | .5 | D | 16.2 |
| PAA 300K | 1.0 | D | 25.2 |
| PAA 50K | .5 | D | 25.9 |
| PAA 50K | 0 | B | 79.5 |
| Polymin 6 | 1.0 | B | 17.1 |
| PEI XD 30259.01 | .5 | B | 4.3 |
| PEI XD 30269.01 | .5 | B | 53.6 |
| Jefumine T-403 | .5 | B | 64.1 |
| PAA 300K | 1.0 | B | 72.4 |
| PAA 50K | .5 | B | 74.7 |
| PAA 300K | .3 | B | 79.4 |
| PAA 50K | .3 | B | 79.5 |

The above results show that the polyethyleneimine polyelectrolytes significantly enhanced the degradation resistance of the dolomitic and bath stone aggregate, while the polyacrylic acid and Jefumine T-403 impart some degree of improvement over the untreated aggregate.

EXAMPLE 4.

Additional argillaceous dolomite aggregate and bath stone aggregate were evaluated utilizing polyethyleneimines PEI-6, polymin 6, PEI-XD-30259.01 and XD-30269.01 of Example 3. Aqueous solutions were prepared having a range of from 0 part to 10 parts of the polyelectrolyte per 100 parts of water. Treatment of the aggregate was in accordance with the procedure outlined for New York test method 207B-70. The following results were obtained, where D and B are as defined in Example 3:

TABLE III

| Polyelectrolyte | Conc | Rock | % D |
| --- | --- | --- | --- |
|  | 0 | D | 31.1 |
| PEI 6 | .1 | D | 30.5 |
| PEI 6 | .3 | D | 15.7 |
| PEI 6 | .5 | D | 10.7 |
| Polymin 6 | 1.0 | D | 4.1 |
| PEI-XD-30259.01 | .3 | D | 8.2 |
| PEI-XD-30259.01 | 1.0 | D | 4.1 |
| PEI-XD-30269.01 | .3 | D | 16.7 |
| PEI-XD-30269.01 | 1.0 | D | 4.2 |
| PEI-XD-30269.01 | 0 | B | 71.8 |
| Polymin 6 | 1.0 | B | 17.1 |
| PEI-XD-30259.01 | .3 | B | 31.2 |
| PEI-XD-30259.01 | 1.0 | B | 1.3 |
| PEI-XD-30269.01 | .3 | B | 55.6 |
| PEI-XD-30269.01 | 1.0 | B | 27.6 |

The above results further establish that the polyethyleneimine polyelectrolyte and modifications thereof provide superior environmental degradation resistance when tested in accordance with the New York State 10 cycle magnesium sulfate test.

In accordance with the procedure shown in FIG. 1, dolomitic aggregate is conveyed into a 5% solution of a polyethyleneimine described above. The aggregate is passed through a 5% by weight solution of a polyethyleneimine up the ramp by means of the revolving screw and the treated aggregate is discharged at the terminal point within 90 seconds. The treated aggregate is then allowed to collect into a hopper which is blown dry with heated air. There is obtained aggregate treated in accordance with the practice of the present invention. The treated aggregate is then blended with sand and portland cement to produce concrete having approximately 45% by weight of coarse aggregate treated in accordance with the present invention. Additional concrete compositions also can be made utilizing the treated aggregate having from 60% by weight to 90% by weight of the treated aggregate. Further examples of cement and concrete mixtures which can be used in combination with treated aggregate of the present invention are shown in the Encyclopedia of chemical Technology (1979) Vol. 5, pages 163-191, John Wiley and Sons, New York.

EXAMPLE 5

Several polyvalent metallic salts were evaluated as possible candidates as polyelectrolyte gellation agents. Aqueous solutions of the respective salts at concentrations of 10% by weight were added with stirring to aqueous solutions of polyelectrolyte having a concentration of 10% by weight of polyelectrolyte. The following table shows the results obtained, where "Y" indicates gellation or precipitation, and "N" indicates no gellation:

TABLE IV

| Salt | PEI* | Tetramine** T-403 | Polyacrylic acid |
| --- | --- | --- | --- |
| $MgSO_4$ | Y | Y | Y |
| Mg Acetate | Y | Y | Y |
| MgCl | Y | Y | Y |
| $MgCO_3$ | N | — | — |
| $Na_2SO_4$ | N | N | N |
| $Na_2CO_3$ | N | N | N |
| $CaSO_4$ | N | Y | Y |
| $Al_2(SO_4)_3$ | Y | Y | Y |
| $FeCl_3$ | Y | Y | N |
| $FeSO_4$ | Y | Y | N |
| $CdSO_4$ | Y | Y | Y |
| $CoSO_4$ | Y | Y | Y |
| $CrSO_4$ | Y | Y | Y |
| $CuSO_4$ | N | Y | Y |
| $PbCrO_4$ | Y | Y | Y |
| $SnSO_4$ | Y | Y | — |

*Imine $(CH_2-CH_2-N)_n$
**Polyoxypropylamine

Figure 5:
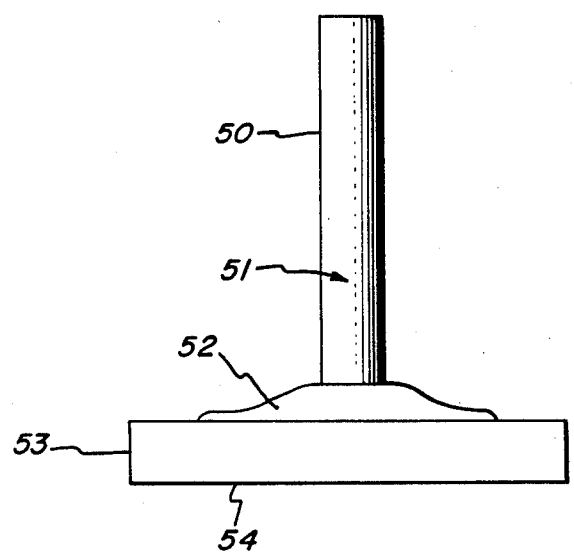

A testing apparatus for evaluating the effect of polyvalent metallic salt gellation is shown by FIG. 5. A glass tube is shown at 50, a 60 mil thickness rock slab is shown at 53 and the testing solution interface is shown at 52.

Slabs of graywacke sandstone were attached to glass tubes utilizing an epoxy resin adhesive. The sandstone slabs were exposed for 1-2 minutes with various liquids including distilled water, an aqueous 10% by weight of PEI-6 solution and a saturated magnesium sulfate solution. In addition, a sandstone slab was initially treated with the aqueous PEI-6 solution followed by treatment with the saturated magnesium sulfate solution.

The degradation resistance of the treated slabs were tested by measuring the average loss of testing liquid through the slabs under pressure of 20 psi. The testing liquids included distilled water, a saturated magnesium sulfate solution is distilled water and a 10% sodium chloride solution in distilled water. After 1 week, two effects were noted in certain cases. The back surfaces at 54 of the slabs were altered in terms of color and texture. In addition, extremely fine cracks were observed at a magnification of 10x. In those slabs which were altered after one week, there also was found an inorganic deposit on the back surface and a physical disintegration after several additional weeks. The loss of liquid was found to be approximately 0.5 cc per day.

Surprisingly, the slabs treated with magnesium sulfate behaved in a completely different manner. The magnesium sulfate treated slab was found to be impervious to water after a three month period. However, the MgSO4 treated slab underwent a progressive change of appearance within four days as a result of exposure to aqueous NaCl and ultimately deteriorated. In contrast, the slab treated with both PEI and MgSO4 had not undergone any loss of liquid or any change in physical characteristics as a result of exposure to distilled water, saturated MgSO4 solution or 10% aqueous NaCl.

With further reference to FIG. 5, a further evaluation of various rock slabs were made to determine the effectiveness of the slabs as anionic exchange membranes. The rock slab surfaces at 52 were evaluated without treatment, treated with polyelectrolyte, or subsequently treated with polyelectrolyte and magnesium sulfate as described above. Sodium chloride testing solutions varying in concentrations between 0.01 mole to 0.1 mole were utilized at 51. Each of the slabs were further immersed in sodium chloride solutions varying in concentrations between 0.01 mole to 0.1 mole. Electrodes were placed in the salt solution inside the tube at 51 and in the sodium chloride in which the slab was immersed. The electrodes were joined to a Leeds and Northrop Research ph Meter, model #7416. Sandstone (S), marble (M) and dolomite (D) were evaluated as membranes. The following electrochemical potential data are shown in Table V, where the numbers shown are millivolt values for the various concentrations of sodium chloride, and conc. I is at 52 and conc. II is at 54:

TABLE V

| Conc. I/II | .01M/.1M | .1M/1M | .01M/.01M | .1M/.1M |
|---|---|---|---|---|
| S-17 | 38.0 | 27.2 | −1.6 | −1.0 |
| S-18 | 45.9 | 28 | | |
| S-21 | 35 | 24 | −9.1 | +0.1 |
| S-16 | 41.9 | 27 | | |
| S-16 (treated with PEI) | 49 | 24.8 | −98.8 | −10.1 |
| S-15 | 49.3 | 29.2 | | |
| S-15 (treated with PEI/ | 57.3 | 13.3 | −91.8 | −13.0 |

TABLE V-continued

| Conc. I/II | .01M/.1M | .1M/1M | .01M/.01M | .1M/.1M |
|---|---|---|---|---|
| MgSO4) | | | | |
| M-15 | 17.3 | 6 | −5.0 | −.2 |
| D-16 | 32 | 8 | −10 | −.1 |
| M-19 | 16.2 | 2.2 | −3.0 | +.2 |
| D-15 | 32 | 8.0 | −10.0 | −1.0 |

The above results show that sandstone, marble and dolomite can be classified as anionic exchange membranes. Treatment of the sandstone slabs with either a PEI solution, or with a PEI solution and a magnesium sulfate solution substantially alters the voltage. Measurement of the electrical resistance of both treated and untreated slabs have been found to be approximately 50 Kohms.

EXAMPLE 6.

In accordance with Example 1, graywacke sandstone aggregate was treated with various polyethylenepolyamine polymers of the type illustrated by XD-30259.01 of the Dow Chemical Company, having a molecular weight in the range of about 431 to 629. There was utilized a 10% aqueous solution of the polyethylenepolyamine to treat the aggregate. Treated and untreated aggregate were evaluated in accordance with the sulfate soundness test and the following results were obtained, where %D indicates weight percent of rock loss due to degradation, "control" indicates the absence of polyethylenepolyamine and MW indicates molecular weight of the polyethylenepolyamine:

| MW | % D |
|---|---|
| control | 85 |
| 431 | 14.3 |
| 507 | 14.0 |
| 596 | 15.0 |
| 629 | 16.9 |

The above results show that the polyalkylenepolyamine utilized in the practice of the present invention is effective as a polyelectrolyte to impart enhanced degradation resistance to untreated aggregate although a decrease in degradation resistance results as the molecular of the polyalkylenepolyamine increases. Based on this date, those skilled in the art would expect that polyalkylenepolyamines having a molecular weight up to about 1,000 would also impart a satisfactory degree of degradation resistance to untreated aggregate following the same procedure.

Although the above examples are directed to only a few of the very many variables which can be employed in the practice of the present invention, it should be understood that the present invention is directed to a much broader class of polyelectrolytes which can be used in the form of an aqueous solution or an organic solvent solution to treat a much broader variety of aggregate and shaped stone structure. As used in describing the practice of the method of the present invention and the products obtained therefrom, the term "polyalkylenepolyamine" is more particularly defined in Vol. 10, pages 616 to 621 of the Encyclopedia of Polymer Science and Technology, John Wiley and Sons, Inc., 1969.

What I claim as new and desire to secure by Letters Patent of the United States is:

1. A method for treating rock in the absence of unhardened cement to upgrade the rock's resistance to environmental degradation which comprises
   (1) wetting the rock with an aqueous ionic polymer solution having at least 1% by weight of the ionic polymer which has a molecular weight of up to about 1,000 and is a member selected from the class consisting of a polyacid, a polybase, and a polyampholite, and
   (2) allowing or effecting the drying of the treated rock.

2. A method in accordance with claim 1, where the rock is aggregate.

3. A method in accordance with claim 1, where the rock is a preexisting stone or concrete structure.

4. A method in accordance with claim 1, where the ionic polymer is polyalkylenepolyamine.

5. A method for treating aggregate having an average diameter of at least ¼" in the absence of unhardened cement to upgrade the resistance of the aggregate to environmental degradation which comprises
   (1) wetting the aggregate with an aqueous ionic polymer solution having at least 1% by weight of the ionic polymer which has a molecular weight of up to about 1,000 and is a member selected from the class consisting of a polyacid, a polybase, and a polyampholite and
   (2) allowing or effecting the drying of the aggregate.

6. A method in accordance with claim 5, where the aggregate is limestone.

7. A method in accordance with claim 5, where the aggregate is marble.

8. A method in accordance with claim 5, where the aggregate is sandstone.

9. A method in accordance with claim 5, where the ionic polymer is polyalkylenepolyamine.

10. Aggregate having an average diameter of at least ¼" treated with a water soluble ionic polymer selected from the class consisting of a polyacid, a polybase, and a polyampholite in the absence of unhardened cement.

11. Limestone aggregate having an average diameter of at least ¼" treated with a water soluble ionic polymer selected from the class consisting of a polyacid, a polybase, and a polyampholite in the absence of unhardened cement.

12. Marble aggregate having an average diameter of at least ¼" treated with a water soluble ionic polymer selected from the class consisting of a polyacid, a polybase, and a polyampholite in the absence of unhardened cement.

13. Sandstone aggregate having an average diameter of at least ¼" treated with a water soluble ionic polymer selected from the class consisting of a polyacid, a polybase, and a polyampholite in the absence of unhardened cement.

14. A concrete composition comprising sand, portland cement and up to 90% by weight of aggregate treated in the absence of unhardened cement with ionic polymer selected from the class consisting of a polyacid, a polybase, and a polyampholite.

15. A concrete composition in accordance with claim 14, having about 45% by weight of aggregate treated in the absence of unhardened cement with ionic polymer selected from the class consisting of a polyacid, a polybase, and a polyampholite.

16. A concrete composition in accordance with claim 14, where the ionic polymer is polyalkylenepolyamine.

17. A method for treating aggregate having an average diameter of at least ¼" in the absence of unhardened cement to upgrade resistance of the aggregate to environmental degradation which comprises
   (1) wetting the aggregate with an aqueous ionic polymer solution having at least 1% by weight of the ionic polymer which has a molecular weight of up to about 1,000 and is a member selected from the class consisting of a polyacid, a polybase, and a polyampholite,
   (2) allowing or effecting the drying of the treated aggregate,
   (3) wetting the surface of the ionic polymer treated aggregate with an aqueous solution of a salt of a polyvalent metal and
   (4) allowing or effecting the drying of the resulting treated aggregate.

18. A method in accordance with claim 17, where the ionic polymer is polyethylenepolyamine.

19. A method in accordance with claim 17, where the polyvalent metal salt is magnesium sulfate.

20. A method in accordance with claim 17, where the aggregate is limestone.

21. A method in accordance with claim 17, where the aggregate is marble.

22. A method in accordance with claim 17, where the aggregate is sandstone.

23. Aggregate having an average diameter of at least ¼" treated with ionic polymer selected from the class consisting of a polyacid, a polybase, and a polyampholite in the absence of unhardened cement which is further treated with a gellation agent.

24. Limestone aggregate in accordance with claim 23.

25. Marble aggregate in accordance with claim 23.

26. Sandstone aggregate in accordance with claim 23.

* * * * *